United States Patent
Farris et al.

(10) Patent No.: US 6,495,181 B1
(45) Date of Patent: Dec. 17, 2002

(54) SOAK APPARATUS FOR LEACHING SOLUBLE CONSTITUENTS FROM INSOLUBLE MATERIALS

(75) Inventors: Terry Lee Farris, Dandridge, TN (US); Griscom Bettle, III, Sarasota, FL (US); Richard Russell Clark, Knoxville, TN (US); Douglas Edward Johnson, Seymour, TN (US)

(73) Assignee: Bush Brothers & Company, Knoxville, TN (US)

( * ) Notice: Subject to any disclaimer, the term of this patent is extended or adjusted under 35 U.S.C. 154(b) by 0 days.

(21) Appl. No.: 09/489,748

(22) Filed: Jan. 21, 2000

Related U.S. Application Data

(60) Provisional application No. 60/116,709, filed on Jan. 22, 1999.

(51) Int. Cl.[7] ............................. A23L 1/20; A23L 1/28
(52) U.S. Cl. ..................... 426/425; 426/430; 426/634
(58) Field of Search .................. 426/425, 634, 426/430

(56) References Cited

U.S. PATENT DOCUMENTS

| | | |
|---|---|---|
| 140,469 A | 7/1873 | Church |
| 245,006 A | 8/1881 | Moore, Sr. |
| 1,973,247 A | 9/1934 | Closmann |
| 2,309,139 A | 6/1943 | Rector |
| 2,539,226 A | 6/1947 | Bierman |
| 2,538,285 A | 3/1948 | Swayze |
| 2,703,274 A | 6/1950 | Giesse et al. |
| 581,175 A * | 1/1952 | De La Calle |
| 3,726,209 A | 4/1973 | Stoltze et al. |
| 4,101,285 A | 7/1978 | Tilby |
| 4,155,293 A | 5/1979 | Spiel et al. |
| 4,132,162 A | 6/1979 | Magnuson |
| 4,158,067 A | 6/1979 | Wouda |
| 4,234,429 A | 11/1980 | Rhodes et al. |
| 4,258,011 A | 3/1981 | Prazmowski |
| 4,470,344 A | 9/1984 | Bushman |
| RE31,913 E | 6/1985 | Barger |
| 4,525,370 A | 6/1985 | Parkes |
| 4,456,893 A | 10/1985 | Silver |
| 4,824,939 A | 4/1989 | Simpson |
| 608,554 A | 8/1998 | Moodie |
| 6,110,727 A * | 8/2000 | Widmer et al. |
| 6,287,469 B1 * | 9/2001 | Ashburn et al. |

\* cited by examiner

*Primary Examiner*—Anthony J. Weier
(74) *Attorney, Agent, or Firm*—Scully, Scott, Murphy & Presser

(57) ABSTRACT

A soak or leaching tank installation which is intended to extract soluble constituents from insoluble materials, and more particularly, a horizontal flow soak tank for removing soluble components, such as sugars or oligosaccharides, from edible beans which are in a stage of being processed. A method is desired which utilizes a recirculating water system in conjunction with the soak apparatus or horizontal flow tank in order to leach solubles, such as sugars in the form of oligosaccharides and other potentially soluble components from insoluble materials.

23 Claims, 5 Drawing Sheets

SOAK APPARATUS FOR LEACHING SOLUBLE CONSTITUENTS FROM INSOLUBLE MATERIALS

This application claims the benefit of Provisional Patent Application No. 60/116,709; filed on Jan. 22, 1999.

BACKGROUND OF THE INVENTION

1. Field of the Invention

The present invention is directed to the provision of a novel and unique soak or leaching tank installation which is intended to extract soluble constituents from insoluble materials, and more particularly, relates to a horizontal flow soak tank for removing soluble components, such as sugars or oligosaccharides, from beans which are in a stage of being processed. More specifically, there is disclosed a method which utilizes a novel recirculating water system in conjunction with the inventive soak apparatus or horizontal flow tank in order to leach solubles, such as sugars in the form of oligosaccharides and other potentially soluble components from insoluble materials.

In general, soak or leaching tanks and methods for leaching or extracting soluble constituents from a variety of insoluble comestible and non-comestible materials as a function in the steps of processing the materials, are well known and highly developed in the technology, and have been and are employed in broad sectors of industry for many years. Among such leaching apparatus, there are presently employed leaching systems incorporating so-called upright columns in the form of vertical towers or the like, wherein there are contained stacks of comestible, such as edible beans which are to be soaked in order to extract unwanted or undesirable soluble constituents therefrom. In order to implement the foregoing, normally, heated water or other suitable liquid solutions are filled into the tower and caused to flow downwardly through a stack or pile of the material being treated. In essence, this type of vertical leaching apparatus has proven to be somewhat problematic in the use thereof, especially when applied to comestibles, such as beans. This is because encountered leaching or soaking conditions are not always uniform between the upper and lower layers of the vertical stack of beans, and are not always uniform horizontally across the bed of materials which are to be processed, thereby occasionally resulting in an uneven leaching of soluble constituents therefrom. This non-uniformity in the soaking conditions, at times, may adversely influence the taste and physical characteristics or textures of the processed beans. Moreover, the utilization of vertical leaching columns or tower-type soak tanks causes the lower layers of the beans to be subjected to the weight of a high superimposed column or stack of beans, damaging or even crushing the lower layers of the charge of beans. Additionally, the use of a vertical column or tower structure increases the stresses encountered by the supporting floor structure, inasmuch as the weight of the beans and the soak liquid, and that of the mechanical structure of the tower itself, is concentrated over a relatively smaller surface area, and thereby requires either expensive structural reinforcements and support flooring, or necessitates having to reduce the size of the vertical soak apparatus or towers. It has also been found that vertical columns tend to restrict swelling/expansion of the beans in the lower portions of the vessel. This, resultingly, adversely affects bean yield.

Nevertheless, although the bottommost beans or layers of beans may be crushed by the weight of liquid-swelled beans which are resting thereon, vertical tanks or tower constructions are frequently preferred because they are easy to empty by gravity upon the opening of a bottom valve.

2. Discussion of the Prior Art

Different types of leaching or soaking apparatus which are presently employed for extracting or leaching undesired soluble components from various insoluble materials; for instance, comestibles such as beans to render them more digestible or coffee beans for purposes of decaffeination, are also subject to limitations preventing simple operative constructions which, without requiring heavy equipment expenditures, would facilitate a uniform and highly satisfactory degree of soaking and leaching of soluble constituents from insoluble materials on an economical commercial scale of production.

Rector, U.S. Pat. No. 2,309,139 discloses a process and apparatus for decaffeinating coffee in which a leaching or soaking step with the use of a fluid solvent in a downward flow is employed for the extraction of caffeine from the coffee beans and wherein the apparatus basically consists of a vertical columnar extraction unit. This, in essence, consists of the type of apparatus whereby, in its application, crushing of the solids is not particularly problematic, inasmuch as the coffee beans are to be comminuted in subsequent steps. Consequently, there is no critically in maintaining the product in its whole or undamaged physical condition, such as would be required for comestible beans.

Barger, U.S. Reissue Patent No. 31,913 discloses an extraction apparatus in the form of a vertical tower or column for the continuous extraction or leaching of oils and other soluble substances from solid or insoluble materials. This structure employs a vertical flow and sequence of screens for separation of the soluble and insoluble elements of the processed material.

Although various horizontal type of apparatus are also known in the technology for removing soluble constituents from particulate or insoluble materials, these are generally complex in nature and require the provision of a multiplicity of movable parts which would not be desired for the soaking or leaching treatment of relatively delicate comestible beans where it is intended to avoid any damage thereto while rendering the beans more digestible. Moreover, such types of equipment or installations for processing employing movable components are frequently difficult to operate and maintain, inasmuch as the components are subject to wear, and also necessitate a high energy input in order to achieve and maintain the desired soaking, extracting and leaching effects.

Thus, Bushman, U.S. Pat. No. 4,470,344 discloses a horizontal apparatus for the extraction of soluble oils from citrus peel wherein water spray nozzles are adapted to soak the solid components in order to extract the soluble oils therefrom. As illustrated, this horizontal soaking and leaching equipment necessitates the use of numerous movable components such as drive rollers or the like for continuous conveyance of the process materials.

Closmann, U.S. Pat. No. 1,973,247 discloses a horizontal drum for the extraction with liquid and through the steaming of raw unroasted coffee beans, wherein again this equipment necessitates the oscillation or semi-rotation of the drum. In this instance, the coffee beans which are arranged in screened sections in the lower half of the rotatable drum are compressed by upper layers of coffee beans. Although this action may cause some damage to the beans, this may be permissible with regard to coffee beans, but cannot be tolerated during the soaking of whole edible beans for rendering these more digestible through the extraction of solubles, such as oligosaccharides.

Moodie, U.S. Pat. No. 608,554; Swayze, U.S. Pat. No. 2,538,285; Giesse, et al., U.S. Pat. No. 2,703,274; and Rhodes, et al., U.S. Pat. No. 4,234,429, each disclose various types of horizontal leaching installations adapted for the removal of soluble components from particulate materials. However, these publications each utilize a plurality of movable components and drive elements, requiring extensive maintenance and energy consumption in moving the components while causing soluble substances to be leached from subdivided solids through the intermediary of liquids conducted through screens or filters. Basically, the foregoing installations require high levels of energy input in connection with implementing the leaching or soaking processes while operating movable and readily wearable process elements.

In order to clearly and unambiguously provide an installation which has the attendant advantages of being able to deliver high commercial production rates in the soaking of materials and extraction of soluble constituents from the insoluble portions thereof; for instance, extracting sugars from products, such as edible beans, to render them more digestible, the installation incorporates a novel and unique horizontal soak apparatus which eliminates the need for essentially any moving components, and wherein the process of extracting solubles is implemented through the circulation of heated water to soak and swell the beans. A high degree of effectiveness in the design of industrial soak tank equipment of this type is achieved in the attainment of large production capacities. As previously indicated, presently employed soak tanks are limited in throughput capacity by the vertical extents thereof, since taller tower-like tanks are more likely to cause bottommost layers of edible beans to be crushed by the pressure caused by the expansion of the stacked liquid-swelled beans. Although the drawbacks of this type of soak operation for removing solubles are well known in the technology, the vertical tanks are widely used inasmuch as they are easily emptied under gravity by merely the opening of a bottom valve.

As may be evident, it would be economically advantageous to construct large capacity soak tanks possessing lower heights and greater horizontal dimensions in order to avoid beans being subjected to crushing from high stacks of beans, particularly beans which have absorbed soak water and are consequently quite considerably increased in size, with such horizontal soak tanks being essentially known in the art. Subsequent to the beans having absorbed a sufficient amount of soak water, the water-swelled beans and any unabsorbed water containing extracted solubles are discharged. In this case, beans which are more digestible can be readily produced when the water is heated and recirculated through the beans. Nevertheless, a substantially uniform flow of water through a pile of beans is rather difficult to achieve and maintain, and pursuant to the state of the art, practitioners distributed soak water from either top-to-bottom or bottom-to-top through the installations. However, this approach, wherein the bean pile has to be supported by a small holed screen to enable substantially uniform water distribution, and wherein the equipment must possess the necessary physical supportive strength, substantial structural reinforcement is necessary. Such reinforcement, however, has a tendency to block distribution holes and create so-called dead zones downstream or upstream, which disrupt an even flow of the soak or leaching water. For example, a currently employed horizontal soak tank is that of a barley soak tank employed in a brewery, and wherein the goal is merely simple rehydration, reducing such prior art soak tanks to be adequate for their intended use. When it is desirable to produce more digestible beans, and wherein sugars and other solubles in the beans, such as oligosaccharides are to be extracted from the beans in a soak tank, commonly measured as brix-in-soak water, the soaking requirements demand that a careful and consistent time and temperature control over the flow of the soaking liquid, such as water, be implemented to extend substantially uniformly across a bean pile, such concepts are not able to be readily implemented with presently available installations. Thus, one example of a simple measurement of said uniformity of flow includes the temperature distribution across the bean pile following a change in the inlet water temperature. A second measure of the foregoing uniformity is the brix-in-soak water across said bean pile after the leaching of soluble constituents from the comestibles. Pursuant to a preferred embodiment, time temperature and soak water Brix are continuously monitored and employed to control the process.

SUMMARY OF THE INVENTION

Pursuant to the present invention, there is accordingly provided a horizontal soak tank for leaching or extracting solubles, such as oligosaccharides from edible beans, wherein the beans would not be crushed during a soak cycle within which each and every bean can be aqueously treated under different temperatures over successive periods of time, and wherein each bean of a charge of beans in the soak tank is imparted an identical treatment so as to provide for the desired uniformity in the soaking and water-absorption of the beans, particularly for the leaching of solubles therefrom, and without evidence of substantially any damage being sustained by the beans during the soak and leaching process in the tank. In order to achieve the foregoing, the horizontal tank is optionally connected to a balance tank for temperature and flow control containing a portion of the soak water to which temperature controls are imparted, in correlation with desired processing requirements, a suitable pumping arrangement facilitates temperature-regulated water to be pumped in laminar flow through the charge of beans in the soak tank, and in continuous flow returned to the balance tank over a specified time period. This soak cycle is repeated under varied conditions, both as to temperature and time, in circulating the flow through the soak tank, until the intended amounts of solubles have been extracted from the beans, rendering the latter potentially more digestible to a consumer, while retaining the desired texture and taste of the beans.

Accordingly, it is an object of the present invention to provide a novel horizontal soak tank facilitating the extraction of solubles from insoluble materials.

Another object of the present invention resides in the provision of a horizontal soak tank for the extraction of soluble constituents from edible beans through the use of a non-laminar flow of water through a screen arrangement in the soak tank.

Yet another object of the present invention resides in the provision of a horizontal soak tank as described herein, wherein soluble constituents comprising oligosaccharides are extracted from beans during a continuous cycle by a non-laminar flow of water through a system of screens in the soak tank in a sequence of controlled temperature, flow and time conditions.

A further object of the present invention resides in the provision of a method of extracting soluble constituents from edible beans utilizing the novel horizontal soak tank as described herein.

BRIEF DESCRIPTION OF THE DRAWINGS

Reference may now be made to the following detailed description of a preferred embodiment of a soak tank for the extraction of soluble constituents from an insoluble material, taken in conjunction with the accompanying drawings in which.

DETAILED DESCRIPTION OF A PREFERRED EMBODIMENT

Figure 1:
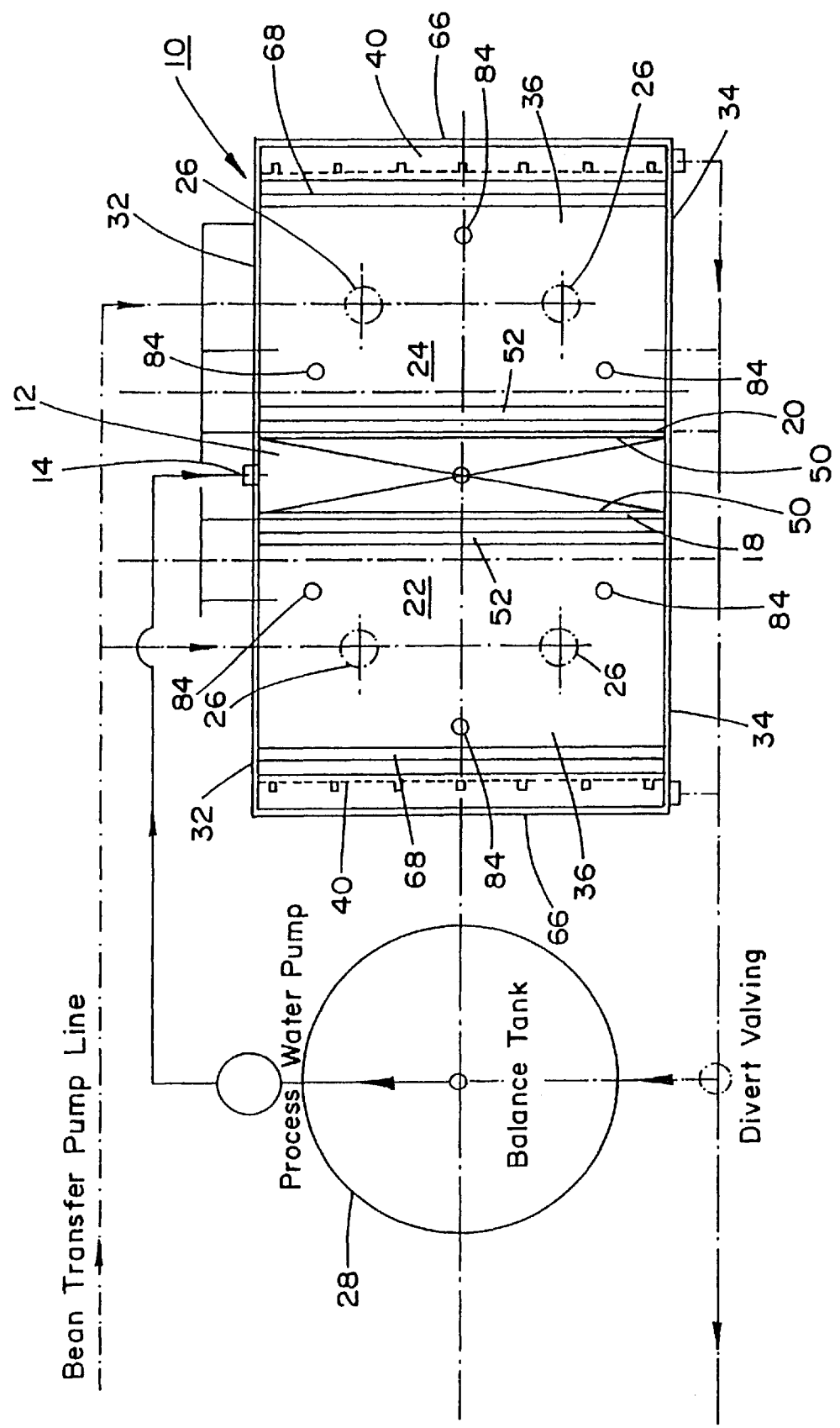
FIG. 1 illustrates, generally diagrammatically, a top plan view of a horizontal flow soak tank system pursuant to the present invention.
Figure 2:
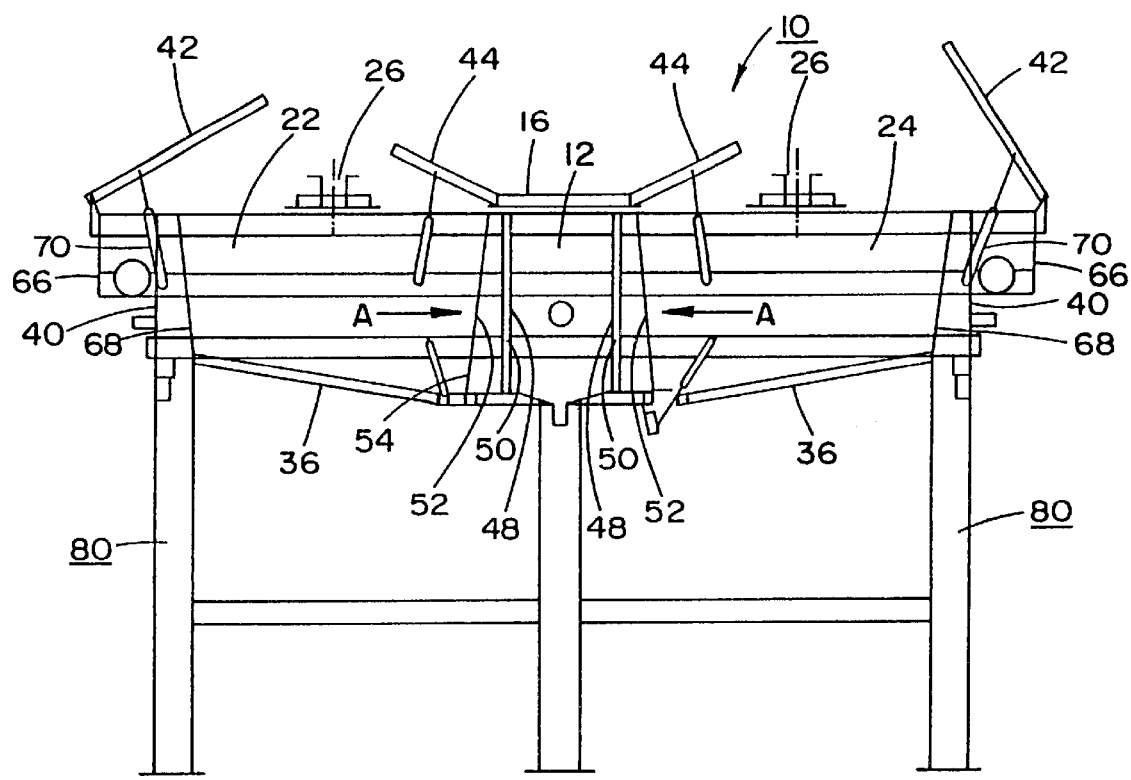
FIG. 2 illustrates a partially sectional front view of the soak tank of FIG. 1.
Figure 3:
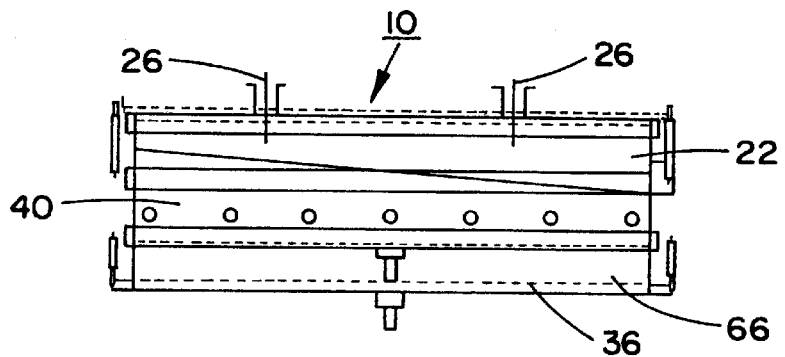
FIG. 3 illustrates an end view of the soak tank of FIG. 1.
Figure 5:
FIG. 5 illustrates a sectional view taken along line 5—5 in FIG. 4.
Figure 4:
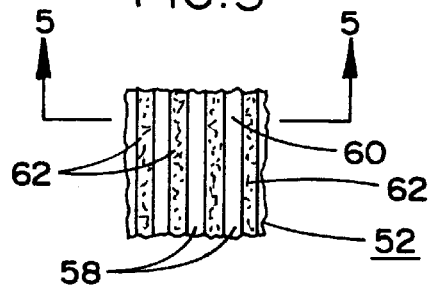
FIG. 4 illustrates a fragmentary view of a portion of the screen in the soak tank, as viewed in the direction of arrows A in FIG. 2.

Referring in detail to the drawings, the horizontal flow soak tank 10 includes a header 12 of box-shaped configurations which possesses an inlet 14 for a soaking liquid, such as temperature-controlled water, and has a pressure holding cover 16 for maintaining a superatmospheric pressure in the header. Communicating with the opposite sides 18 and 20 of the header 12 and extending horizontally therefrom in mirror-image arrangement are a pair of hoppers 22, 24, each adapted to receive through inlets 26, a charge of beans which are to be soaked in a continuous water flow and heated so as to extract solubles such as sugars in the form of oligosaccharides therefrom. The header 12 and hoppers 22, 24 communicate by means of a system of screens, as detailed hereinbelow, and wherein the soak tank 10 is in a continuous recirculating water flow connection with a balance tank 28 which provides a continuous flow of processing water under predetermined temperature and timing cycle conditions for effecting the treatment of the beans.

Figure 6A:
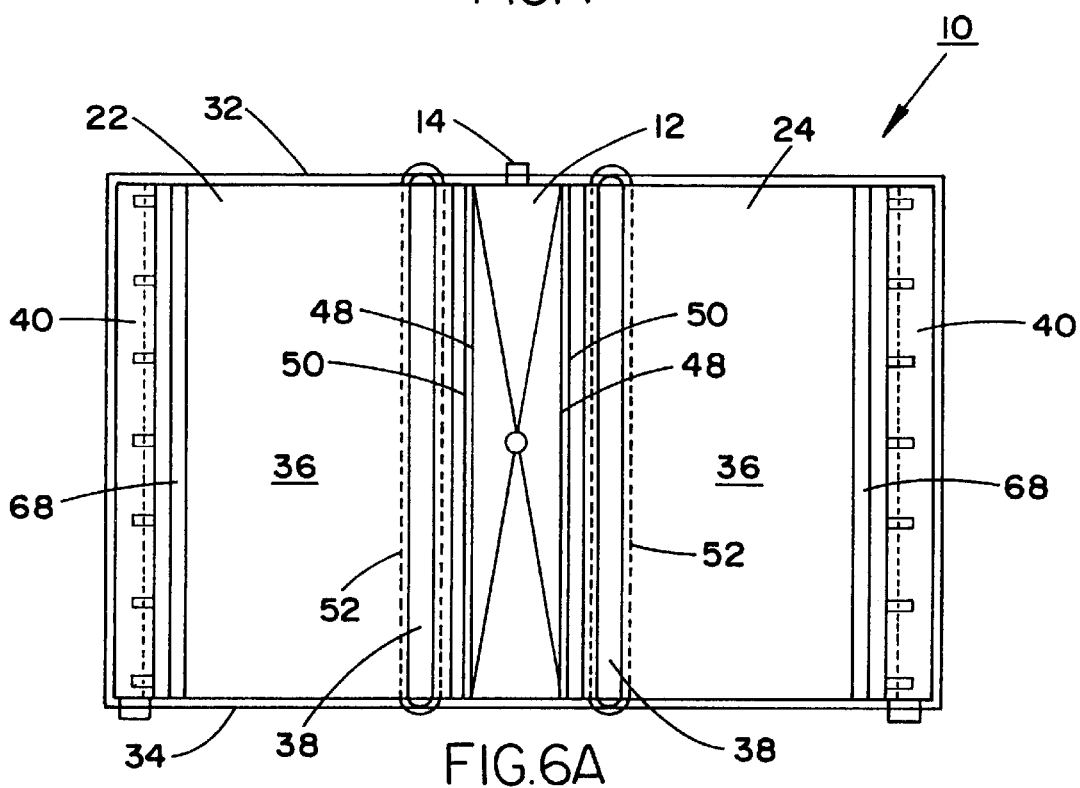
FIG. 6A illustrates, in a view similar to FIG. 1, the product discharge gates of the soak tank operating horizontally.

Each hopper 22, 24 is of a generally rectangular configuration having vertically extending sidewalls 32, 34, and a bottom wall 36 which slopes at a generally upward incline away from the juncture thereof with the lower end of the header 12. As illustrated in FIG. 6A, extending along the bottom wall 36 of each hopper proximate the header lower end is a horizontal closable elongate outlet gate 38 for discharge of processed beans at the termination of the soak cycle. In a modified or second embodiment, as diagrammatically illustrated in FIG. 6B, there is shown a vertically closable outlet or discharge gate 38A arrangement. The transverse end of each hopper distant from the header 12 communicates with an overflow trough 40 for reconveying the flow of water from the hoppers to the balance tank 28. The hoppers 22, 24 are each adapted to be sealed by closing covers 42 and 44.

Pursuant to the invention, water is continuously introduced from the balance tank 28 into the header 12 under a superatmospheric pressure and a controlled temperature, and then passed through a system of screens communicating the header 12 with the hoppers 22, 24 so as to control the flow through the pile of beans contained in each of the hoppers of the horizontal flow soak tank. The water, after passing through the piles of beans in a generally horizontal laminar flow path is passed through dewatering screens into an overflow trough and then recirculated into to the balance tank 28, preferably by gravity flow, temperature and flow regulated in the balance tank, and again returned to the header for recirculation through the hoppers, thereby providing a continuous flow circuit.

As described in more specific detail hereinbelow, the inventive system of screens employed in the horizontal flow soak tank 10 provides a first set of screens between the header 12 and each respective hopper 22, 24, whereby a first vertical screen 48 converts turbulent flow of water in the header into non-laminar flow as the water passes through the screen 48. A further therewith closely spaced screen 50, which may be parallel therewith, and wherein each screen possesses a small mesh will convert the non-laminar flow of the water into a transitional stage towards a somewhat more uniformly laminar flow as the water passes through the second screen 50. The flow then passes through a third screen 52, which may be a slotted bar screen, as described hereinbelow, and functions as an end wall for each respective hopper 22 and 24, wherein flow through the screen 52 is a substantially laminar water flow extending uniformly horizontally across the width and cross-section of the tank containing the pile of beans extending towards the overflow trough. As a result of the foregoing, each bean in the pile of beans in the hopper 22 or 24 is soaked substantially uniformly to extract solubles therefrom, inasmuch as the flow of the circulating water is maintained at essentially constant levels within the hoppers of the soak tank 10.

The screen 52 is designed to separate the beans contained in the hopper from the jets of water emanating from the individual holes in the screen 50. This, in effect, enables the water jets to dissipate and become a uniform laminar plug flow during passage through screen 52. The latter is inclined relative to the vertical, so that the bottom end 54 thereof is extended forwardly to be closely adjacent the edge of the respective horizontal elongate gate 38 for discharging processed beans at the termination of the extraction of solubles. This inclined orientation of the screen 52, in conjunction with the upwardly sloping bottom wall 36 of each hopper will impart a slight upward circulation to the bottom pile of beans, ensuring a more uniform treatment thereof. This inclined orientation of the screen 52 provides a relief angle for the expansion of the bean pile as the beans rehydrate and expand in the respective hoppers. In addition, the use and location of screen 52 separates the pile of beans from the negative impact of direct impingement of the soak water media exiting from the screens 48 and 50.

Figure 6B:
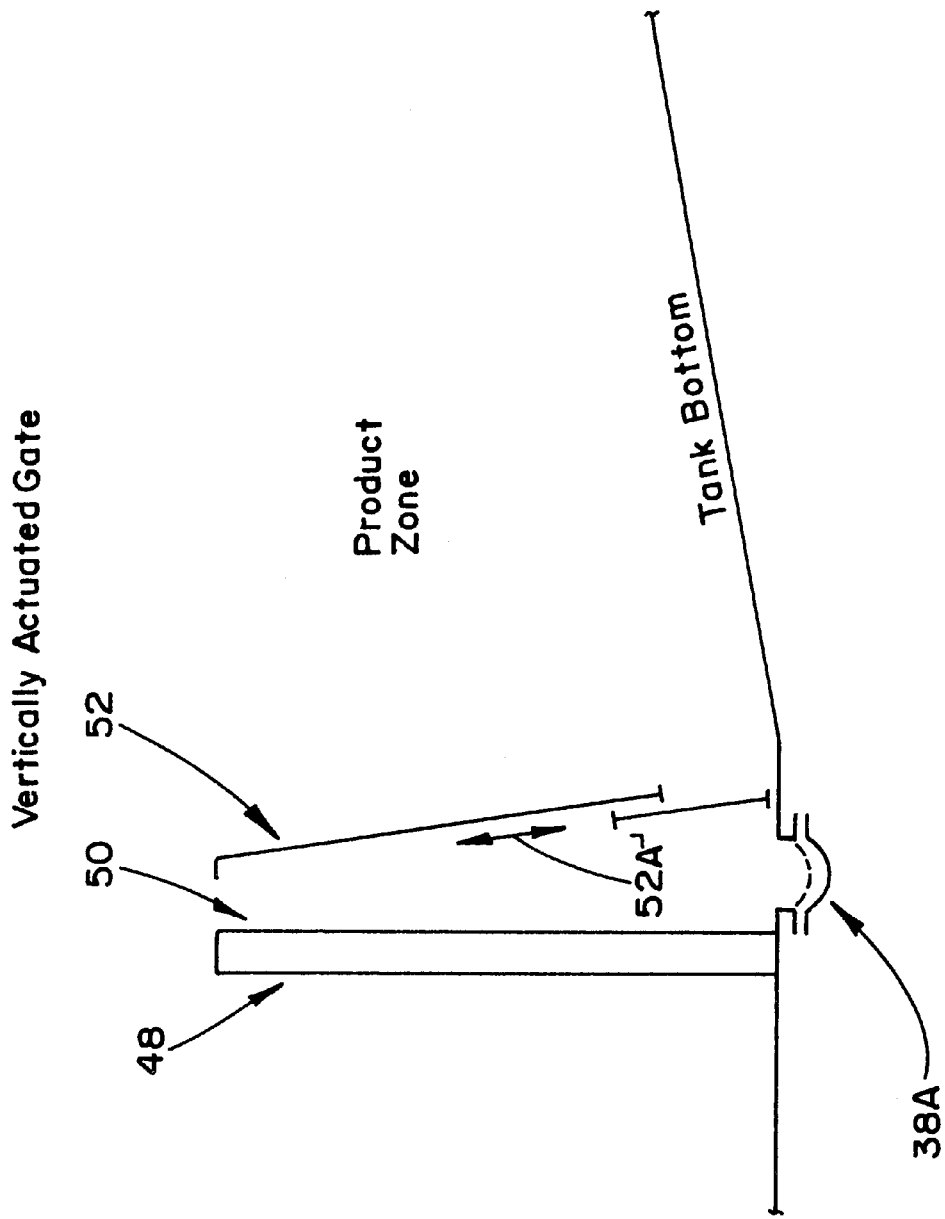
FIG. 6B illustrates, generally diagrammatically, the product discharge gates of the soak tank operating vertically.

In the alternative embodiment, as illustrated in FIG. 6B, a vertically closable elongate bar screen is employed to discharge beans. Pursuant to this embodiment, movable screen 52A operates as part of upwardly angled screen 52 during processing so as to provide a relief angle during this processing of the beans. During bean discharge, screen 52A is vertically actuated to allow beans from hoppers 22 and 24 to enter the discharge area 38A.

The surface 56 of the screen 52 facing the interior of the respective hopper 22, 24, so as to form the so called slotted bar screen, is provided with closely spaced vertically extending raised ribs 58 having smooth surfaces 60 along which the beans can gently slide upwardly during circulation as the beans swell. The openings or apertures 62 in the screen 52 are located intermediate the ribs to facilitate the flow of water therethrough, while the ribs hold the beans in spaced relationship from the apertures 62 so as to prevent clogging of the latter. In essence, the pile of beans which is being soaked and processed is angled upwardly at the bottom thereof so as to cause the beans to gently lift up and thus prevent damage to the lower layers of the beans.

At the discharge end 66 of each hopper 22 or 24 there is located a screen 68 which is similar in construction to screen 52, such as a slotted bar screen, but which is inclined at a reverse angle relative thereto, so as to form a bean holding structure for the hopper, and also provides a relief angle for the bean pile as swelling takes place. A solid baffle 70 arranged interiorly of screen 68 imparts an under-overflow to the water exiting from the soak tank as it is recirculated to the balance tank 28.

In essence, the entire horizontal flow soak tank 10 may be supported on suitable support structure 80 as a component of a process system for producing digestible beans, for example, such as navy beans, which are treated in the soak tank to extract sugars and other soluble components from the beans, during the continuous soaking process wherein water at predetermined temperature and cycling time conditions is continuously circulated throughout the soak time. Commercially, each hopper 22, 24 may contain a charge of beans which are to be processed of, for example, 1,400 lbs. navy beans for a total of 2,800 lbs.; although other bean sizes, weights and quantities may, of course, be readily contemplated within the scope of the invention.

The water which is continually pumped into the header 12 from the balance tank 28, after having been heated (or regulated) to a predetermined temperature as discussed hereinbelow, under the control of a suitable control system, passes through the screens into the hoppers 22, 24.

Located at regions within the hoppers 22, 24 containing the beans which are to be processed are a plurality of temperature sensors as probes 84 which will constantly monitor the temperature of the process water so as to enable controllers to compensate for temperature deviations in the water of the balance tank 28 which is being recirculated into the soak tank 10 and to thereby accurately regulate the processing cycle.

DESCRIPTION OF SOAK TANK OPERATION

The operation of the soak tank system is essentially as follows:

The empty clean hoppers 22, 24 are initially filled with clean water at a temperature which may or may not be controlled. This water may be a mix of hard and soft water, with a preferable mix containing about 50 ppm of calcium carbonate. Optionally, there may be added water treatment processing aids to the water; for instance, such as phosphate.

The beans are then added to the tank, wherein the amount of beans added will vary, based on the swelling characteristics of a particular bean genus. In a preferred commercial embodiment, the soak tank 10 and the attached balance tank 28 of an industrial sized system contains 1,420 gallons of water. In this embodiment there may be employed 2,800 lbs. of dry (8–15% moisture) navy beans. In this embodiment, the soak tank is divided into two hoppers 22, 24 each holding 1,400 lbs. of the beans.

In the balance tank 28, the water is heated to about 115° F. and recirculated through the bean pile in horizontal plug flow for about thirty (30) minutes after first achieving a set point temperature. In this particular step, there occurs rapid rehydration, and the beans increase in volume by about 50%. Pursuant to a preferred embodiment, the water residence time is three (3) minutes which, in effect, is the free water (computed by the soak tank volume minus the bean volume) divided by the water flow rate in gallons.

Thereafter, the water is a continuous flow and is automatically heated to 129° F., and with automatic temperature adjustments, recirculated through the system in horizontal plug flow for thirty-nine (39) minutes after first reaching the set point temperature. In this step, the moisture is increased to about 42% (approximately a four fold increase versus the dry bean) and the volume of the beans increases an additional 10%. Importantly, the full swelling potential of the beans is not attained at this point. When beans are fully swelled; for example, by extending the time in this step, there can be encountered excessive, undesirable and subsequent post cooking bean cracking. This cracking, as known by those skilled in the art, would be unimportant and the time could be extended in the event that the end product is extended to be bean paste wherein cracking of the beans would not be a critical feature. However, when the beans are to be employed as whole beans for subsequent cooking, for example, their use in soups or stews or the like, then the time cannot be extended.

Thereafter, the recirculating water is heated to 145° F. for nine (9) minutes, this being a transition temperature which will ensure that subsequent temperatures are not exceeded. In this step, the moisture of the beans typically increases sharply from about 42% to about 48% moisture.

The water is then heated to 147° F. for twenty-four (24) minutes, wherein some physical changes in the beans take place, such changes being endothermic and/or exothermic transitions, and which increase the rate in the reduction of oligosaccharides in the beans. This increase in the rate of oligosaccharides reduction in the beans is easily measured, monitoring the increase in soak water brix.

Inasmuch as, at that point in the process cycle, the old soak water has accumulated high levels of sugar and other soluble ingredients which have leached out of the beans, such high levels in the soak water inhibit subsequent leaching of other soluble components from the beans. Accordingly, in order to ameliorate the foregoing, fresh soft water is bled into the recirculating water. A different number of bleed-in levels would be acceptable, wherein a preferred rate of controlled bleed-in of fresh water is within about 1% to 4%, preferably 2.6%; in essence, fresh water is added at a volume of preferably 2.6% of the free water in balance tank 28 plus the soak tanks 22 and 24. In this embodiment, by the way of example, when water is circulated at 360 gallons per minute, preferably 10 gallons per minute of old waters is drained off from the tank discharge system, upon which there is automatically added preferably 10 gallons per minute of fresh, soft water in order to maintain the water level. In the event that the rate of water bleed is excessive, for instance, if the old contaminated water is dumped completely and replaced with fresh water, then the osmotic pressure drop from the high brix old water to zero brix or uncontaminant fresh water could be so intense that the bean volume could substantially instantaneously increase by as much as 40%. The above-mentioned osmotic pressure difference is defined as the sugar-in-bean minus the sugar-in-water difference. Such a dramatic volume change in the beans would typically rupture more than half of the beans during subsequent cooking, which would result in an unacceptable condition.

The mixture of old water and fresh bleed-in water in continuous operation of bleed, fill and heat, always flowing at 360 gallons/minute, is then heated to 149° F. for twenty-four (24) minutes, and additional physical changes take place in the beans in this processing step.

In this next step, the set point is lowered to 145° F. Cooling occurs with the addition of 135° F. bleed-in water. The total time in this step is sixty-six (66) minutes, and in this step, substantial oligosaccharide elimination is attained.

The set point is again lowered to 135° F. for nine (9) minutes, in order to reduce the stress on the beans when the water is changed in the next step. This step controls the mouthfeel of the cooked beans.

The bleed-in of fresh water is now terminated.

Thereafter, the water is automatically drained and replaced with fresh, soft water at 135° F.; the fresh water having a pH which is typically about 0.5 units higher than the old water pH. The beans are held at 135° F. for nine (9) minutes, and final bean meat firming takes place in this step.

It can be readily ascertained by one skilled in the art that times at given temperatures are all divisible by the residence time of the soak tank 10. Thus, the reported times are really computed in units of tank turnover and elapsed time, wherein a bean at the inlet side of the recirculating water has to experience the same conditions as a bean at the discharge end of the recirculating water.

The recirculating water system employed incorporates water temperature controls (not shown) using well known process control techniques. The water is recirculated by means of the balance tank 28 at a rate sufficient to cause the flow rate through the plurality of perforations in the screens to become non-laminar; but with the flow of the water through each hopper being laminar in nature.

At such a flow rate, the resistance to flow is such that the upstream turbulent water moves to an adjacent perforation or aperture in the screen, thus substantially balancing the flow through each aperture. However, in the event that a single perforated screen were to be employed rather than the inventive screen system, this would fail to balance the flows completely due to transitory effects as the flow is distributed from a single source entry through many thousands of small discharge apertures. As intended, a second downstream screen performs a secondary redistribution of flow, and it can be ascertained that the downstream screen does not have to be identical with the upstream screen in order to meet the restrictions of non-laminar flow. In the preferred embodiment, both screens are separated from each other by a space adequate to allow flow distribution to occur substantially unimpeded. However, pursuant to a further preferred embodiment, there would be provided an additional relatively large-apertured screen upstream of the small-hole screens/perforated plates or within the overflow troughs. This screen merely removes large particles, such as bean skins and other debris, which can enter the recirculating system. Accordingly, that screen acts like a prior art physical removing filter.

The water flow through the final slotted bar wire screen 52 is substantially equal in its distribution and very slow across the entire screen surface, possibly about 1 cm per second, whereas at this laminar water flow velocity the beans offer very little resistance and the flow stays substantially equal around and through the bean pile with the water eventually reaching the discharge end of the bean pile at the outermost screen at substantially the same velocity and temperature, adjusted for the change in surface area of screen 68 caused by upwardly angled wall 36.

The balance tank 28 is level-controlled, using well known control technology and discharges into a recirculating pump wherein a series of communicating valves permit bleed-out of old water, while a level controller bleeds in fresh water. A bleed-out system from the discharge side of the tank permits old water to be discharged while the level controller concurrently adds fresh water.

Figure 7:
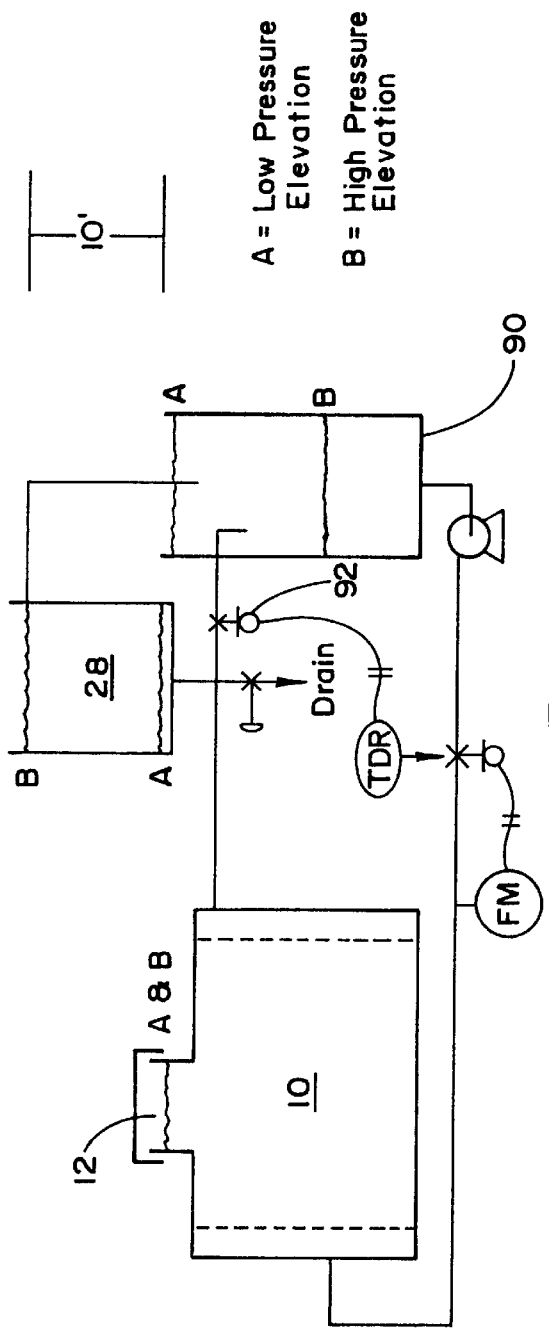
FIG. 7 illustrates a diagrammatic representation of a modified horizontal flow soak tank system.

Refer to FIG. 7 of the drawings, in which components similar to or identical with these described in connection with FIGS. 1 to 6 are identified by the same reference numerals. Inasmuch as any absolute change in pressure in the processing cycle is small, since excessively large pressure changes can rupture the beans, normal non-pressurized vessels or tanks 10 can be employed.

Consequently, the system can be modified by the addition of a hydrostatic catch tank 90 at the discharge of the soak tank 10, with a timer-activated by-pass valve 92. Thus, when the by-pass valve 92 is closed, water is forced to flow into the balance tank, and overflow from the balance tank 28 to discharge into catch tank 90.

This process gradually fills the balance tank 28, and correspondingly gradually increases the hydrostatic head in the soak tank 10.

When the by-pass valve 92 is opened in a logical sequence, the balance tank 28 drains into the catch tank 90, lowering the soak tank pressure down to atmospheric pressure. The size of the balance tank 28 divided by the recirculation rate (volume/volume per time=time) controls the time of transition from high pressure to low pressure and back again.

Figure 8:
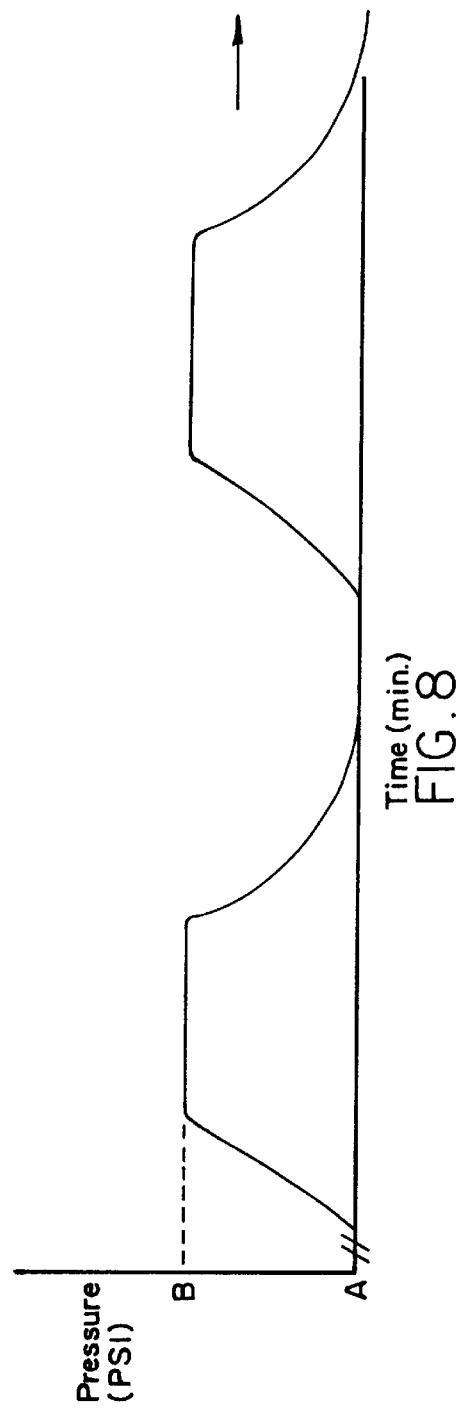
FIG. 8 illustrates a graph of pressure over time profile for the modified system of FIG. 7.

The foregoing oscillating pressure concept, as represented in FIG. 8, provides a bean with the following processing experiences:

1. Partial rehydration
2. Cell-disrupting-expansion to create high internal porosity
3. Pulsed water flow through said pores to extract sugar faster than expected in the prior art by oscillating pressure
4. Attenuated pressure changes to minimize rupturing and skin toughening; with steps 3 and 4 being repeated throughout the soak cycle
5. Normal cooking From the foregoing it becomes readily apparent that the invention is directed to a novel and advantageous soak tank structure, which may be particularly employed for edible beans which will remove undesired soluble constituents, such as oligosaccharides or sugars and other constituents which are desired to be eliminated from beans.

Furthermore, although the foregoing equipment has been described in connection with the soaking and leaching of soluble constituents from edible beans, it may be readily apparent to one skilled in the art that other types of materials, both edible or non-edible may be processed by means of the present apparatus, in view of which the scope of the apparatus and its functioning is not limited to beans as described hereinbefore.

While there has been shown and described what is considered to be preferred embodiment of the invention, it will, of course, be understood that various modifications and changes in form or detail could readily be made without departing from the spirit of the invention. It is, therefore, intended that the invention be not limited to the exact form and detail herein shown and described, nor to anything less than the whole of the invention herein disclosed as hereinafter claimed.

What is claimed is:

1. A method for the extraction of soluble constituents from insoluble materials through the intermediary of a liquid medium continuously circulated through a horizontal flow soak tank; said method comprising:
   (a) providing a header for receiving a substantially continual flow of said liquid medium;
   (b) arranging at least one horizontal hopper adapted to contain a quantity of said soluble-containing insoluble materials in liquid flow receiving communication with said header; and
   (c) interposing a plurality of screens along a path in the liquid flow between said header and said at least one hopper for controlling the flow of said liquid through said at least one hopper for substantially uniformly extracting said soluble constituents from said insoluble material.

2. A method as claimed in claim 1, wherein said plurality of screens includes positioning a first screen for communicating with said liquid flow within said header; positioning a second screen in substantially parallel spaced relationship with said first screen for distributing the liquid-flow along the cross-sectional area between said header and said at least one hopper; and positioning a third screen downstream of said second screen in said at least one hopper for separating jetting liquid flow from said soluble-containing insoluble material.

3. A method as claimed in claim 2, wherein said horizontal liquid is conveyed through said at least one hopper in a laminar plug flow generated by said plurality of screens.

4. A method as claimed in claim 3, wherein said flow is within a transitional flow range below a turbulent flow of said liquid and above laminar flow of said liquid.

5. A method as claimed in claim 2, wherein a fourth screen is arranged in said at least one hopper at a liquid discharge end opposite to and distant from said third screen, said liquid upon flowing through said at least one hopper being passed through said fourth screen towards means for recirculation to said header.

6. A method as claimed in claim 5, wherein said third screen is inclined upwardly and rearwardly to facilitate circulation of said insoluble material during extraction of said soluble constituents from said insoluble materials.

7. A method as claimed in claim 6, wherein said fourth screen proximate said discharge end is inclined upwardly and rearwardly opposite the direction of inclination of said third screen so as to assist in the vertical vector movement of said insoluble materials.

8. A method as claimed in claim 2, wherein said at least one hopper comprises upstanding sidewalls, and a bottom wall sloping generally upwardly from a lower end of said third screen towards a discharge end of said at least one hopper to assist in the discharge of processed insoluble materials.

9. A method as claimed in claim 2, wherein said third screen has a surface facing towards the insoluble materials contained in said at least one hopper, and an angled vertically extending structure consisting of a plurality of closely spaced upstanding ribs being formed on said surface so as to assist in the circulation of said insoluble materials while preventing apertures located in said third screen intermediate said ribs from being clogged by said insoluble materials.

10. A method as claimed in claim 1, wherein a liquid circulating path is provided between a discharge end of said at least one hopper and a liquid inlet to said header, and imparting a continuous flow to said liquid along said circulating path.

11. A method as claimed in claim 10, wherein said liquid circulating path includes a balance tank for maintaining a liquid level and quantity of flow of said liquid circulating through said soak tank.

12. A method as claimed in claim 11, wherein said liquid circulating path passes through a screen for filtering impurities from said liquid flow.

13. A method as claimed in claim 11, wherein the temperatures of the liquid conveyed from said balance tank to said header and said at least one hopper is controlled to be set at specified temperatures during predetermined successive periods of time so as to achieve a required extraction of said soluble constituents from said insoluble materials while protecting the integrity of said materials.

14. A method as claimed in claim 13, wherein there is monitored the brix of the liquid conveyed from said balance tank to said header and said at least one hopper to signal when changes should occur in various process parameters.

15. A method as claimed in claim 13, wherein there is implemented temperature sensing of the liquid to enable regulation of the temperature of the liquid in said balance tank responsive to sensed deviations of the temperature from a specified set point or set points.

16. A method as claimed in claim 10, wherein a portion of the circulating liquid which is excessively contaminated is replaced by an equal amount of clean liquid in said circulating path during specified intervals in the operation of said installation.

17. A method as claimed in claim 1, wherein said horizontal flow soak tank is essentially constituted of stainless steel.

18. A method as claimed in claim 1, wherein said insoluble materials comprise edible beans, and said liquid comprises temperature-controlled water for extracting and removing soluble constituents, such as oligosaccharides, from said beans.

19. A method as claimed in claim 1, wherein said liquid is circulated under superatmospheric pressure through said header.

20. A method as claimed in claim 1, wherein two of said hoppers are arranged, respectively, one each on opposite sides of said header in substantially mirror-image relationship with each other, said hoppers being operatively connected in a common circulating system of said extracting liquid flow.

21. A method as claimed in claim 1, wherein pressure oscillations are implemented in said hopper during the processing of said beans.

22. A method as claimed in claim 8, wherein the lower portion of said third screen is substantially vertically actuated to effect substantially complete discharge of processed insoluble materials from said at least one hopper.

23. A method as claimed in claim 8, wherein the lower portion of said generally upwardly sloping bottom wall contains a rotationally activated gate section to enable substantially complete discharge of processed insoluble materials from said at least on hopper.

* * * * *